Figure 1:
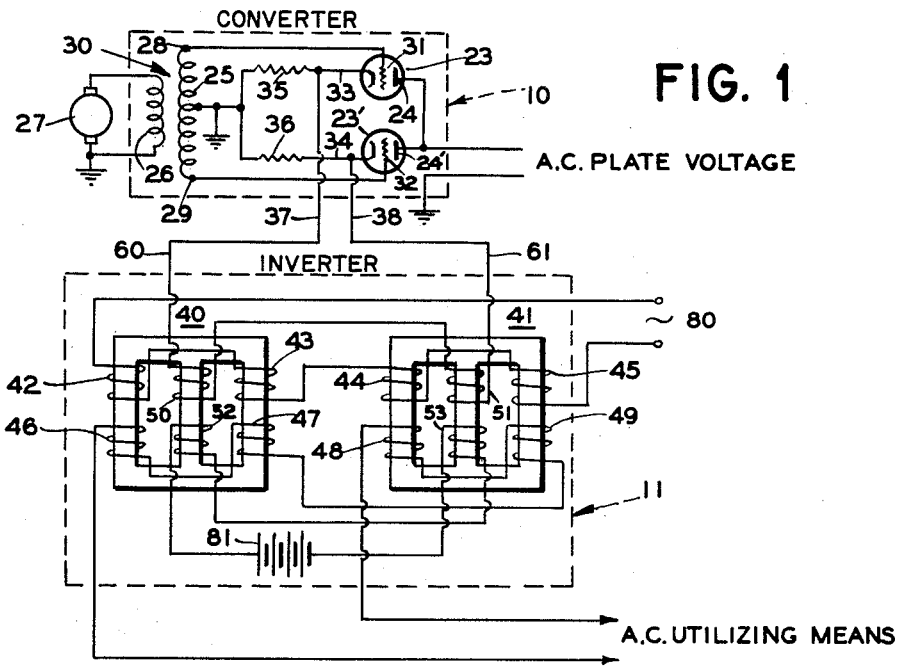

Dec. 25, 1956  A. M. MacCALLUM ET AL  2,775,712
PHASE COMPARISON SYSTEM
Original Filed June 28, 1948

*INVENTORS*
ALAN M. MAC CALLUM
CORLES M. PERKINS
ALFRED BENNETT
BY
*ATTORNEY*

United States Patent Office 2,775,712
Patented Dec. 25, 1956

2,775,712

PHASE COMPARISON SYSTEM

Alan M. MacCallum, Plainfield, and Corles M. Perkins, Rutherford, N. J., and Alfred Bennett, Bronx, N. Y.

Original application June 28, 1948, Serial No. 35,606. Divided and this application July 26, 1951, Serial No. 238,984

4 Claims. (Cl. 307—73)

This invention relates generally to electrical phase comparison systems and has particular application to those systems including means and methods for matching the phase of a plurality of discretely originating signals. This application is a division of copending application Serial No. 35,606, filed June 28, 1948, now abandoned, and assigned to the same assignee as the present application.

Accordingly, it is one of the objects of the present invention to provide a novel converter comprising an electron discharge device having a plurality of control electrodes to which a plurality of input signals may be directed for obtaining direct current outputs having a polarity and magnitude dependent upon the phase and amplitude of the input signals delivered thereto.

Another object of the present invention is to provide a network for comparing the phase of a multiplicity of A. C. signals.

Yet another object of the present invention is to provide a phase comparison network for use with A. C. utilizing means.

Still another object of the present invention is to convert received A. C. signals into phase sensing indications for use in guidance systems.

Still another object of the present invention is to provide, in guidance systems, means for converting an alternating current signal of a given phase and amplitude into a direct current signal having a polarity and magnitude directly proportional to the phase and amplitude of said given A. C. signal.

Another object of the present invention is to provide a frequency mixer for alternating current signals having differing frequencies.

Another object of the present invention is to provide a novel alternating current converter.

Yet another object of the present invention is to provide, in craft guidance systems, an alternating current converter which may be cooperatively associated with a non-electronic type of direct current inverter which gives an A. C. voltage output proportional, in phase and amplitude, to the converter signal input, and which may be used for controlling suitable guidance mechanism.

A further object of the present invention is to provide a novel converter for use in a phase comparison network and wherein a direct current voltage is obtained which has a polarity and magnitude directionally proportional to the input phase and amplitude of an alternating current voltage applied thereto.

Still another object of the present invention is to provide means, apparatus and instrumentalities adapted for attaining the foregoing objects whether such uses or means have been particularly referred to or not.

In the drawings,

Figure 1 is a circuit diagram of the novel converter and inverter used in a preferred embodiment of the invention.

Figure 2:
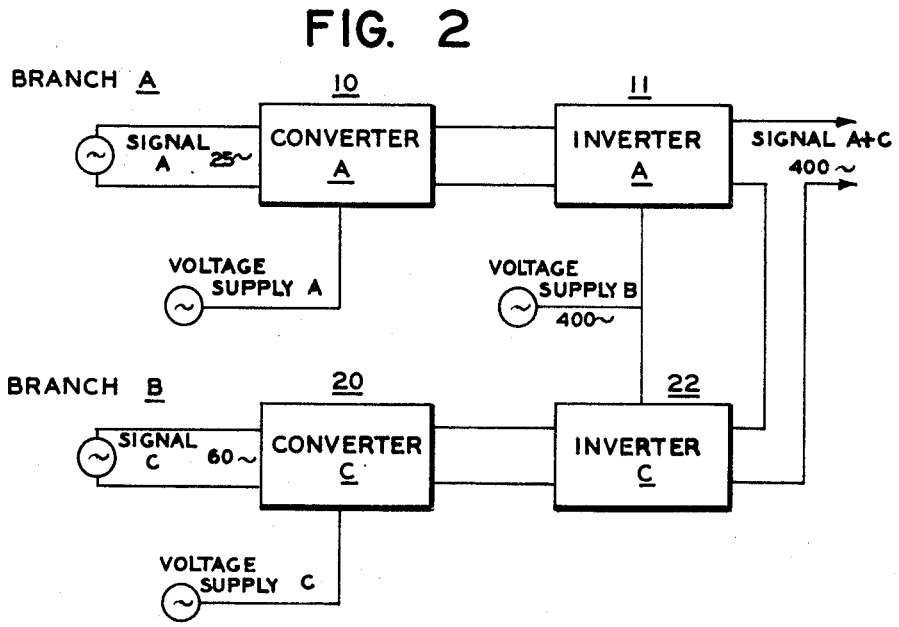

And, Figure 2 is a block diagram representation illustrating an embodiment of the present invention and showing the arrangement of components forming a discriminator system utilizable in the guidance of dirigible craft.

Similar reference characters are used in all the above figures to indicate parts having corresponding functions.

Generally speaking, the hereinafter described invention discloses means for obtaining output D. C. signals from an A. C. converter having a polarity and magnitude correlated with the phase and amplitude of alternating current input signals delivered thereto.

The converter comprises an electron discharge device having a pair of control grids connected to either side of a center-tapped transformer. The anodes or plates of the converter are phasingly related to the phase of the input signals placed on the control grids. As a result thereof, an output voltage, having a polarity and magnitude which are related in phase and amplitude to the input signals, is taken from the cathode resistors of the electron discharge device. The D. C. voltage thus derived from the converter is then fed to a non-electronic type of inverter which, in turn, converts the D. C. signals to correlated alternating current signals.

By feeding the output of the inverter to a comparison circuit which circuit may have a reference generating means included therein, a comparison may be effectuated between a reference signal included in the circuit and the input signal from the inverter. This comparison voltage may be fed to associated A. C. utilization means.

Further, it may be desirable that a second A. C. signal derived from a discrete source, such as a second transmitter or generator of varying frequency, be converted in like manner from an A. C. to a D. C. signal and be combined or mixed with the first signal. This combination of signals having different frequencies, and/or phase, as derived in the aforesaid manner, may be suitably combined so as to control mechanism used in the guidance of dirigible craft, for example, an automatic pilot.

Referring now to the drawings, in Figure 1 a converter 10 is used for reducing an input A. C. voltage of varying amplitude and phase to an output D. C. voltage coincidently varying in magnitude and polarity as its A. C. input. Coupled to converter 10 is inverter 11 which is utilized to derive an A. C. signal from the D. C. signal obtained from converter 10.

Converter 10 comprises a pair of electron discharge devices 23, 23' having anodes 24 and 24' to which a suitable A. C. anode voltage is connected. A center-tapped secondary winding 25 of transformer 30 is used to couple an A. C. signal derived from primary winding 26 of transformer 30 from a source of A. C. signals 27. Secondary winding 25 has its ends 28 and 29 connected to control electrodes 31 and 32. Cathodes 33 and 34 of electron discharge devices 23 and 23' are connected in series with cathode resistors 35 and 36 to ground. It is thus seen that control electrodes or grids 31, 32 of electron discharge devices or vacuum tubes 23 and 23' are connected in push-pull arrangement; that is, they are arranged to have a 180° phase difference between them by means of input transformer 30. It is also seen that cathodes 33, 34 of the tubes are connected to the plate return through cathode resistors 35 and 36 having a suitable value for producing the necessary cathode potential for operation of the tubes. Anodes 24 and 24' are connected together to the A. C. plate voltage, which is of the same phase as the signal input applied to the control electrode or 180° from the signal input applied thereto.

Substantially the inverter operates so that with no signal applied to transformer 30, plate current will flow through tubes 23 and 23' at the positive half-cycle of the anode voltage impressed thereupon. As a result thereof, current will flow through cathode resistors 35 and 36 to produce a pulsating D. C. voltage across output terminals 37, 38. Since cathodes 33 and 34 will vary in potential together, there results no net potential across output terminals 37 and 38.

However, when an input signal is applied to primary winding 26 of transformer 30 in phase, or 180° out of phase, with the voltage applied to anodes 24 and 24', two voltages appear on each of control electrodes 31, 32, each differing by a phase of 180° due to the induced voltages placed across secondary winding 25 of transformer 30. Thus, it is seen that when the voltage appearing on grid 31 is in phase with the anode voltage, the voltage appearing on the other grid 32 will be 180° out of the phase with the anode voltage.

Thus tube 23, in which the control electrode signal is in phase with the plate voltage, necessarily will draw more plate current. As a result thereof, a greater voltage will appear across cathode resistor 35 commensurate with the amount of flow of current therethrough. Tube 23', which has a grid voltage out of phase with the voltage impressed on plate 24' must, therefore, draw less plate current through its associated resistor 36 and the voltage drop diminishes with the lesser amount of current flowing therethrough. A resultant potential, therefore, will appear across output terminals 37 and 38 proportional to the difference in plate currents flowing through tubes 23 and 23' and proportional to the magnitude of the input A. C. signal.

It is seen, therefore, that a reversal in phase of the input signal to transformer 30 will reverse the phase condition of the voltages impressed on the control grids 31, 32 so as to change the amount of flow of current through resistors 35, 36 associated with cathodes 33 and 34. A greater flow of current will oppositely take place therethrough and thus the polarity of the voltage appearing across output terminals 37 and 38 will also change.

In this manner, converter 10 will accept an A. C. signal having a variable amplitude and phase and will produce as its output a correlatively average direct current voltage having a magnitude and polarity directly correlated with the amplitude and phase of the input signal.

The average D. C. signal obtained from converter 10 is next directed to inverter 11 as by means of conductors 60 and 61. Inverter 11, more fully described in U. S. Serial No. 700,234, comprises two cores 40 and 41 provided with primary and secondary windings thereon. The primary winding is split into two pairs of windings 42, 43 and 44, 45 which are connected together in series aiding relation. The free end of winding 42 is connected with one side of an A. C. source 80 and the free end of winding 45 is connected with the other side of the source.

The secondary winding is split into two pairs of windings 46, 47 and 48,. Windings 46 and 47 are connected in series aiding relation on core 40 and windings 48 and 49 are connected in series aiding relation on core 41; the first set of windings 46, 47, however, is connected in series opposed relation with the second set of windings 48, 49. The free ends of windings 46 and 49 constitute the output taps for an A. C. signal developed therein.

The center leg of each of core 40 and 41 is provided with control windings 50 and 51 which are connected in series aiding relation with each other and their free ends are connected to the D. C. signal output from converter 10. Other control windings 52 and 53 are provided on the center legs of the cores and are connected with each other in series opposed relation and are fed by D. C. current from a suitable source 81.

With no D. C. control signal in windings 50 and 51, the device is balanced and no signal appears at the secondary output. While flux flows in core 40 due to A. C. current in windings 42 and 43 and in core 41 due to A. C. current in windings 44 and 45, the output of the secondary windings is zero because the current induced in windings 46 and 47 of core 40 is equal and opposite to the current induced in secondary windings 48 and 49 of core 41. Since the direct current in both control coils 52 and 53 is of the same value the balance of the system is not disturbed.

Once D. C. current from converter 10 flows in control coils 50 and 51, however, the flux of coil 50 will add with the flux of coil 52 of core 40 saturating the latter core, thereby making it a poor transformer while the flux of coil 51 will oppose the flux of coil 53 of core 41 making the latter a better transformer so that the device becomes unbalanced and an A. C. current will flow at the secondary output. The direction that the A. C. current will flow in the secondary is determined by the direction of the D. C. signal current in control windings 50 and 51.

Since the output derived from inverter 11 is an A. C. voltage having a phase and amplitude directly correlated to the amplitude and phase of incoming A. C. signals received by inverter 10, it is possible to feed a multiplicity of A. C. signals to inverter 10 which may have a phase and amplitude independent of each other and to combine or mix these signals in inverter 11 to obtain a combination signal having a phase and amplitude which is a function of the plural inputs.

Such a case is found where it is desired to obtain a signal for the guidance of dirigible craft, as in the automatic piloting of craft, where signals representing a displacement from a reference and rate of displacement from that reference are mixed to give a combination signal for use in guiding the craft. In the usual case, these signals are so arranged that they are supplied from a common voltage source and are made to agree in phase so as to be mixed directly.

However, many times it is desirable to mix a plurality of signals whose phases do not agree, and perhaps whose frequencies may not be the same or of the same nominal value but having a value which varies about some other signal. By the hereindescribed inverter, it is possible to combine a plurality of signals to give a single voltage having a variable phase and amplitude regardless of the input frequency and phase angles.

Referring now to Figure 2, signal $a$, is a reversible phase, variable amplitude signal having a definite basic frequency, for example, 25 cycles per second. Signal $c$ is a signal similar in character to that of signal $a$ but having a different basic frequency; for example, 60 cycles per second. Assume, for example, that for the guidance of a dirigible craft an output is desired which is a combination of these two signals but which has a frequency of 400 cycles per second. Signal $a$ is fed into converter 10 of branch A as described above. The resulting output from converter 10 is a D. C. voltage which varies in polarity and magnitude in accordance with the phase and amplitude of input signal $a$. This output D. C. voltage is then introduced into inverter 11 where it is converted into an A. C. voltage having a variable phase and magnitude with respect to a voltage $b$ utilized as a reference voltage. The frequency of the A. C. output signal, however, is at the frequency of voltage $b$ which, in this case, is 400 cycles per second.

In a similar fashion, a signal $c$ may be conducted through parallel branch B, first being changed in converter 20 to a D. C. voltage which varies in polarity and magnitude in accordance with the phase and amplitude of signal $c$. The D. C. voltage is next changed in inverter 22 to an alternating current voltage having a variable phase and amplitude with respect to voltage $a$, but also having the frequency of voltage $b$. The two outputs, one from inverter $a$ and the other from inverter $c$, may then be combined directly for utilization as desired since they are now of the same frequency and same phase.

It is seen then, that the device described above may be utilized to perform a multitude of different functions, viz: to combine signals of different phases having the same frequency; or as a frequency changer, per se.

Since various changes and modifications to the form and relative arrangement of the parts described herein may appear to those skilled in the art, it is not intended that the scope of the invention be restricted to the recitations made herein, but rather is to be obtained from a reading of the specification in conjunction with the here appended claims.

What is claimed is:

1. A network for combining signals of different frequencies to provide a summation signal of one frequency, comprising a pair of converters adapted to receive alternating current signals of different frequencies and producing D. C. voltages at their outputs having polarities determined by the phases of the signals, an inverter connected to each of said converters and energized by an alternating current source of said one frequency and controlled by the D. C. voltage from the associated converter, said inverters providing alternating current voltages having said one frequency and having a phase determined by the polarity of the D. C. voltage, and means for combining said alternating voltages from said inverters.

2. A signal chain for a control system, comprising a plurality of converters adapted to receive alternating current signals of different frequencies and each converter being energized by an alternating current source of the same frequency as the associated signal, each of said converters producing a D. C. voltage at its output having a polarity determined by the relative phase of the alternating current source and signal, an inverter connected to each of said converters and energized by a common alternating current source and controlled by the D. C. voltage from the associated converter, said inverters providing alternating current voltages of the same frequency as the associated energizing current source and the phase of said signals relative to the phase of said associated source being determined by the polarity of the D. C. voltages, and means for adding said alternating current voltages from said inverters algebraically.

3. A network for the summation of control signals of different frequencies comprising a first converter for receiving a first alternating current signal of one frequency and adapted to be energized by an alternating current source having the same frequency as the first signal, a second converter for receiving a second signal of a different frequency and adapted to be energized by an alternating current source of the same frequency as the second signal, each of said converters producing D. C. voltages at their outputs having polarities determined by the phase of the corresponding signal, an inverter connected to each of said converters and energized by a common alternating current source for receiving the output of the associated converter and providing an output alternating voltage having a phase determined by the polarity of the D. C. voltage and a frequency corresponding to the common alternating current source, and means connecting the outputs of said converters in series with one another and providing the algebraic sum of the output alterntaing voltages.

4. A network for providing a signal corresponding to a summation of signals having different frequencies and having reversible phases and variable amplitudes, comprising a plurality of converters, each adapted to receive an alternating current signal of different frequency and each including a transformer and a pair of electron tubes, said transformer having a primary winding for receiving the signal and a center tapped secondary winding on which the signal is coupled, said tubes having anodes, control grids and cathodes, means exciting said anodes from an alternating current of the same frequency as the signal received on said primary winding, means connecting said control grids to the opposite ends of said secondary winding, whereby the signal and anode voltages are in phase in one tube and in phase opposition in the other tube depending upon the phase of the signal, and impedances connecting said cathodes and the center tap of said secondary winding whereby the differential direct current voltage across said impedances corresponds in magnitude and polarity to the amplitude and phase of said signal, an inverter connected to each converter, said inverters each including a pair of transformers having cores normally saturated alike and having primary, secondary and control windings thereon, means energizing said last primary windings from a source of alternating current of one frequency, said last secondary windings being normally balanced against each other, and means supplying said control windings with said differential direct current voltage whereby said direct current voltage differentially saturates said cores to unbalance said secondary windings to develop an alternating current output having said one frequency and being modulated in accordance with said direct current voltage, and means connecting the secondary windings of said inverters together to provide a summation of said outputs.

References Cited in the file of this patent

UNITED STATES PATENTS

| | | |
|---|---|---|
| 1,705,993 | Oswald | Mar. 19, 1929 |
| 2,411,916 | Woodyard | Dec. 3, 1946 |
| 2,429,216 | Bollman et al. | Oct. 21, 1947 |
| 2,453,624 | Glass | Nov. 9, 1948 |
| 2,467,347 | Truckses | Apr. 12, 1949 |
| 2,561,329 | Ahlen | July 24, 1951 |
| 2,565,621 | Olson | Aug. 28, 1951 |
| 2,640,939 | Staschoven et al. | June 2, 1953 |
| 2,697,808 | MacNichol et al. | Dec. 21, 1954 |